UNITED STATES PATENT OFFICE.

JOHN P. CABANNE, OF ST. LOUIS, MISSOURI.

PROCESS FOR THE FERMENTATION OF MILK.

944,013. Specification of Letters Patent. Patented Dec. 21, 1909.

No Drawing. Application filed July 9, 1909. Serial No. 507,018.

*To all whom it may concern:*

Be it known that I, JOHN P. CABANNE, a citizen of the United States, and resident of St. Louis, Missouri, have invented certain new and useful Improvements in Processes for the Fermentation of Milk, of which the following is a specification.

My invention relates to an improved process for the fermentation of milk and has for its object to provide a fermented milk product in which the fermentation is due alone to the introduction of a germ known as the Bulgarian bacillus.

In my process I employ whole milk, the first step of the treatment whereof under my process consists in the pasteurization of said milk, which is accomplished by the use of any of the apparatuses well known in the art, in which the milk is held at a temperature of 190° Fahrenheit for about five minutes, although pasteurization may be effected at a lower temperature held during a longer period. The whole milk having thus been pasteurized is reduced to a temperature of about 90° Fahrenheit and at that temperature the germ known as the Bulgarian bacillus, the culture of which is maintained at a temperature of about 90° Fahrenheit is introduced to the mass of whole milk so pasteurized in the proportion of about one pint of said culture to eight gallons of milk. The pasteurized whole milk containing the bacillus is then held at a temperature of ninety degrees for a period varying from twelve to eighteen hours, and until the fermentation of the milk caused by the bacteria has resulted in the development of from .8% to 1.%. When this percentage of lactic acid has been developed, the further fermentation of the product is arrested by reducing the liquid to a temperature of 35° Fahrenheit, and the product is to be maintained between 35° F. and 40° F. until it has been consumed, inasmuch as the elevation of its temperature materially above 40° F. results in the resumption of fermentation and the production of an excess of lactic acid.

Having thus fully described my invention, what I claim as new and desire to have secured to me by the grant of Letters Patent, is:

The improved process for the fermentation of milk consisting of the following steps: pasteurizing whole milk; reducing the temperature of the pasteurized whole milk to about 90° F.; the addition to said whole milk at a temperature of 90° F. of the culture of Bulgarian bacillus in the proportion of about one pint of said culture to eight gallons of pasteurized milk; maintaining the temperature of the pasteurized milk containing said culture, at about 90° F., until the production of about one per cent. of lactic acid has resulted; arresting the fermentation of the fermented product by reducing its temperature to between 35° F. and 40° F.; and maintaining the product at said temperature until it is consumed.

In testimony whereof, I have signed my name to this specification, in presence of two subscribing witnesses.

JOHN P. CABANNE.

Witnesses:
JAMES L. HOPKINS,
WALTER C. STEIN.